United States Patent
Klaffenbach et al.

(10) Patent No.: US 7,506,180 B2
(45) Date of Patent: Mar. 17, 2009

(54) SYSTEM AND METHOD FOR DETERMINING THE POWER DRAWN FROM A SWITCHING POWER SUPPLY BY COUNTING THE NUMBER OF TIMES A SWITCHING POWER SUPPLY SWITCH IS ENABLED

(75) Inventors: David K. Klaffenbach, Battle Ground, WA (US); Michael J. Campin, Battle Ground, WA (US); Algird M. Gudaitis, Vancouver, WA (US); Chadwick W. Stryker, Ridgefield, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 436 days.

(21) Appl. No.: 11/077,627

(22) Filed: Mar. 10, 2005

(65) Prior Publication Data

US 2006/0202667 A1 Sep. 14, 2006

(51) Int. Cl.
*G06F 1/00* (2006.01)
*G01R 19/00* (2006.01)

(52) U.S. Cl. .................. 713/300; 702/57; 702/64; 324/120; 324/415; 324/416

(58) Field of Classification Search .......... 713/300; 323/282; 702/57, 64, 187; 324/415, 416, 324/522, 120
See application file for complete search history.

(56) References Cited

U.S. PATENT DOCUMENTS

| | | | | |
|---|---|---|---|---|
| 4,229,665 A | * | 10/1980 | Tiedt | 307/150 |
| 4,695,936 A | * | 9/1987 | Whittle | 363/21.1 |
| 5,552,694 A | | 9/1996 | Appeltans | |
| 5,694,029 A | * | 12/1997 | Hayes et al. | 323/282 |
| 5,717,579 A | * | 2/1998 | Sohner | 363/17 |
| 5,745,351 A | | 4/1998 | Taurand | |
| 6,058,026 A | | 5/2000 | Rozman | |
| 6,157,179 A | * | 12/2000 | Miermans | 323/282 |
| 6,182,232 B1 | * | 1/2001 | Klein | 713/340 |
| 6,199,969 B1 | | 3/2001 | Haflinger et al. | |
| 6,330,169 B2 | | 12/2001 | Mullett et al. | |
| 6,495,995 B2 | * | 12/2002 | Groom et al. | 323/283 |
| 6,565,177 B1 | | 5/2003 | Corrigan, III | |
| 6,587,361 B2 | * | 7/2003 | Preller | 363/97 |
| 6,606,257 B2 | | 8/2003 | Bourdillon | |
| 6,660,257 B1 | | 12/2003 | McWherter et al. | |
| 6,748,546 B1 | * | 6/2004 | Mirov et al. | 713/320 |
| 6,909,266 B2 | * | 6/2005 | Kernahan et al. | 323/282 |
| 6,943,538 B2 | * | 9/2005 | Choi | 324/142 |
| 6,960,904 B2 | * | 11/2005 | Matsuura et al. | 323/283 |
| 7,075,278 B2 | * | 7/2006 | Uematsu et al. | 323/282 |
| 7,092,260 B2 | * | 8/2006 | Berghegger | 363/21.06 |
| 2002/0131283 A1 | * | 9/2002 | Preller | 363/97 |
| 2006/0217931 A1 | * | 9/2006 | Klaffenbach et al. | 702/187 |
| 2008/0049457 A1 | * | 2/2008 | Choi et al. | 363/21.12 |

FOREIGN PATENT DOCUMENTS

| JP | 59164923 A | * | 9/1984 |
|---|---|---|---|
| JP | 2002238254 A | * | 8/2002 |

* cited by examiner

*Primary Examiner*—Mark Connolly (57) ABSTRACT

Embodiments of a switching power supply circuit are disclosed wherein the number of times that a switch of the circuit is enabled is counted.

36 Claims, 7 Drawing Sheets

SYSTEM AND METHOD FOR DETERMINING THE POWER DRAWN FROM A SWITCHING POWER SUPPLY BY COUNTING THE NUMBER OF TIMES A SWITCHING POWER SUPPLY SWITCH IS ENABLED

BACKGROUND

Many electronic devices make use of switching power supplies. Devices that may use switching power supplies include cell phones, personal computers, notebook computers, personal digital assistants, and a host of other device types. Among the various devices that may use switching power supplies are inkjet printers. Compliance with infrastructure or regulatory power usage limits and detection of malfunctions can be difficult for devices using switching power supplies without the capability to measure the power delivered.

BRIEF DESCRIPTION OF THE DRAWINGS

The claimed subject matter will be understood more fully from the detailed description given below and from the accompanying drawings of embodiments which, however, should not be taken to limit the claimed subject matter to the specific embodiments described, but are for explanation and understanding of the disclosure.

DETAILED DESCRIPTION

Figure 1:
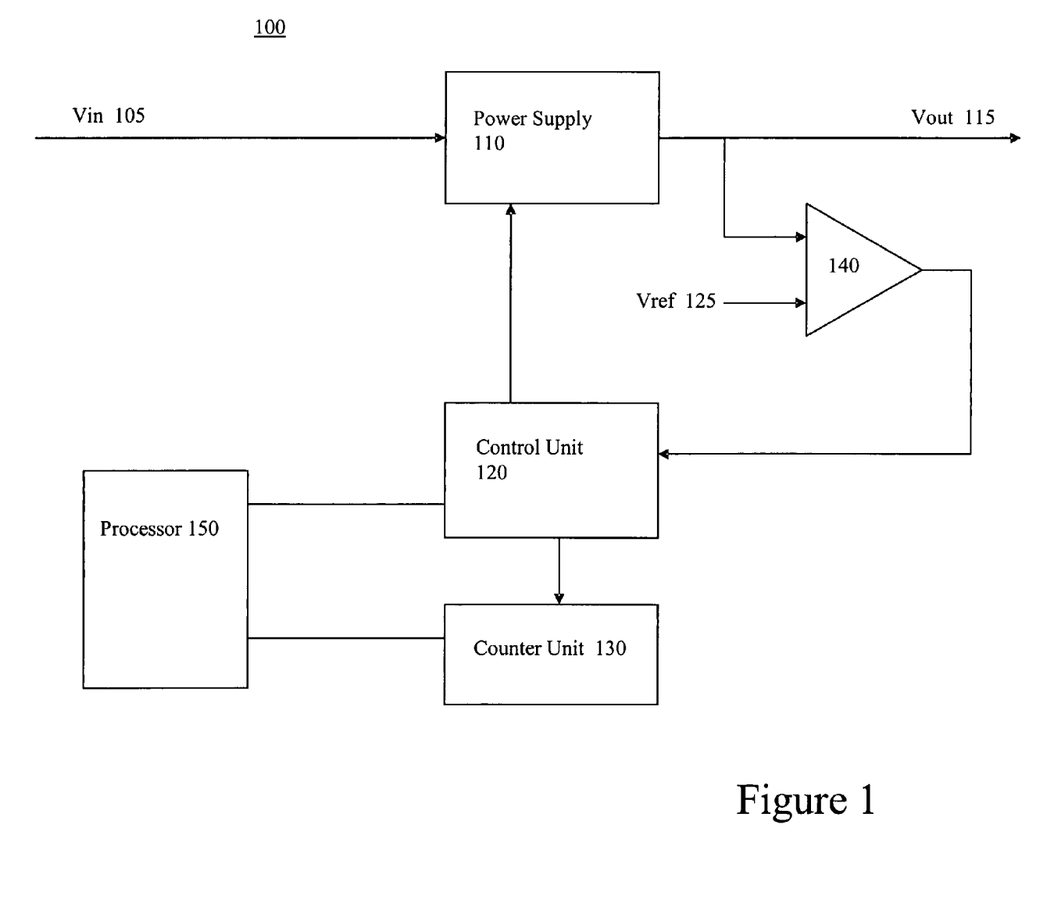
FIG. 1 is a block diagram of one embodiment of an example system.

FIG. 1 is a block diagram of an embodiment of an example system 100 including a power supply 110 and a control unit 120. Control unit 120 for this example operates according to a fixed frequency clock. Control unit 120 controls on a cycle-by-cycle basis whether the power supply 110 transfers additional power to a Vout signal 115. Vout 115 is coupled to a comparator 140 which compares the voltage level on Vout 115 with a reference voltage Vref 125. The output of comparator 140 is coupled to control unit 120. Control unit 120 uses the input from comparator 140 to determine, at least in part, whether to cause power supply 110 to transfer additional power. This determination is made on a cycle-by-cycle basis. That is, for each cycle, control unit 120 decides whether to enable power supply 110 for a portion of that clock period. The amount of time during the clock period that the power supply is enabled may be referred to as an "on time." For each clock cycle, if the voltage level on Vout 115 is greater than Vref, then control unit 120 does not enable power supply 110. Also for each clock cycle, if the voltage level on Vout is less that Vref, then control unit 120 enables power supply 110.

For this example embodiment, power supply 110 may be a switching supply. Switching power supplies may, in general, operate in either continuous conduction mode or discontinuous conduction mode. For this example embodiment, power supply 110 may operate in discontinuous conduction mode. Discontinuous conduction mode is discussed further below in connection with FIG. 3.

System 100 also includes a counter unit 130. Counter unit 130 may include one or more counters for counting the number of times over a period of time control unit 120 enables power supply 110. For this example embodiment, because the clock frequency is closely controlled so that it is substantially constant and because power supply 110 operates in discontinuous conduction mode, if Vin is approximately known and if the "on time" is approximately constant, then the number of times that power supply 110 is enabled over a period of time can be used to determine the approximate amount of power that has been transferred by power supply 110 to the Vout node during that period of time. Under these conditions, the count value is proportional to the actual amount of power transferred.

Other embodiments are possible. For example, enabling the power supply could be based on the output current level instead of voltage level.

Counter unit 130 may include a register to hold a count value that can be accessed by a processor 150. Various software or firmware operations may be performed using the count value to make determinations and perform operations related to power output and power measurement.

Although this embodiment discusses counting the number of times the power supply is enabled over a set period of time, other embodiments are possible where a timer is used to determine how long it takes for the power supply to be enabled a set number of times. For these various embodiments, the set time period or the set number of power supply enablings can be programmable. For embodiments that count the number of times a power supply is enabled over a set period of time, greater measurement accuracy may be achieved by increasing the time period. For embodiments that determine how long it takes for a power supply to be enabled a set number of times, accuracy may be increase by increasing the set number of times the power supply is enabled.

Greater measurement accuracy may be achieved by either counting over a longer period of time or by increasing the number of times the power supply is enabled.

Figure 2:
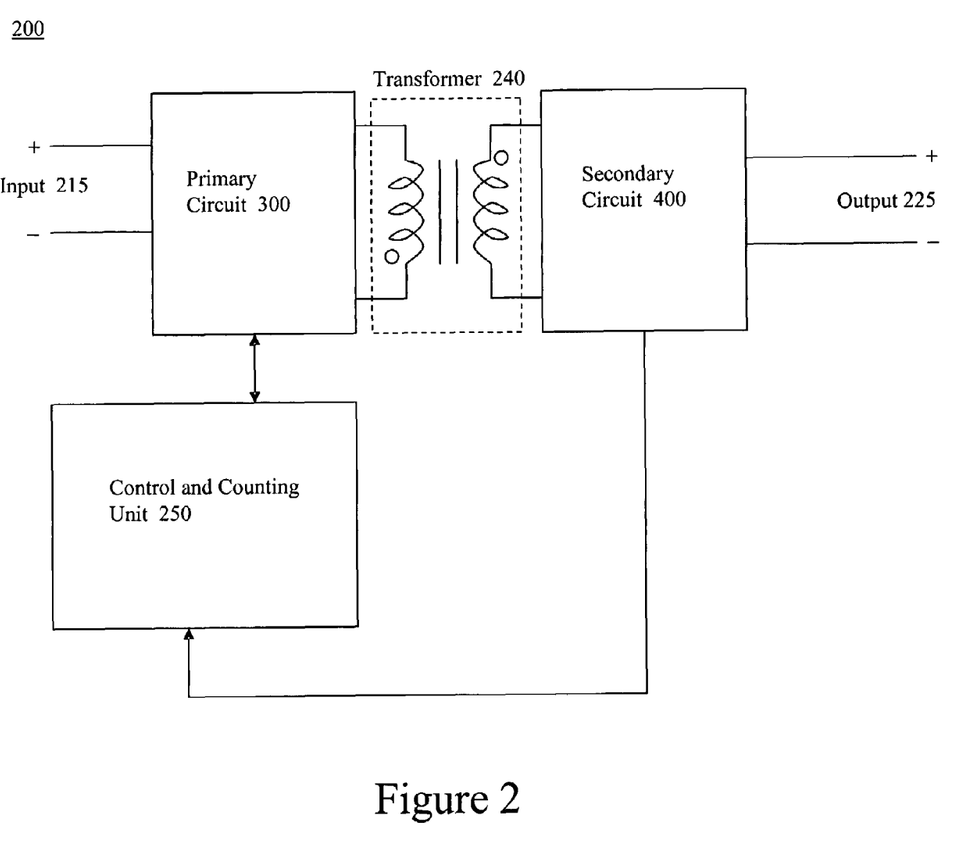
FIG. 2 is a block diagram of an embodiment of an example power supply circuit.

FIG. 2 is a block diagram of an embodiment of an example power supply circuit 200. Power supply 200 includes a primary circuit 300. Primary circuit 300 receives an input voltage at input 215. Power supply 200 also includes a secondary circuit 400. Secondary circuit 400 provides output 225, which may be coupled to a load (not shown).

Primary circuit 300 is coupled to secondary circuit 400 through a transformer 240. The primary side windings of transformer 240 are wound with a polarity opposite that of the secondary side.

Power supply 200 further includes a control and counting unit 250 that is coupled to primary circuit 300 and secondary circuit 400. A more thorough discussion of the operation of the various units of power supply 200 follows below.

Figure 3:
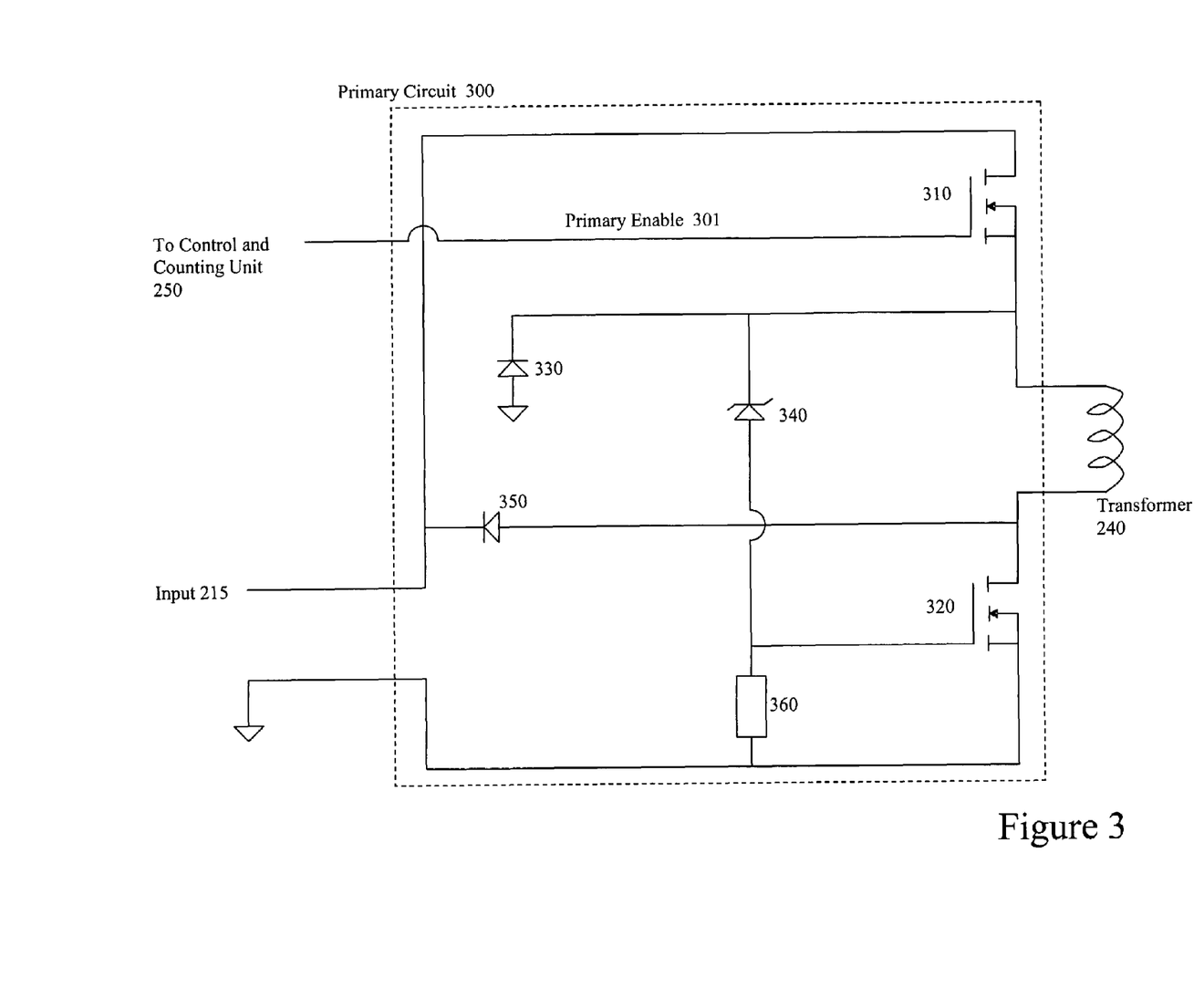
FIG. 3 is a block diagram of an embodiment of a primary circuit that may be used in connection with the example power supply embodiment of FIG. 2.

FIG. 3 is a block diagram of an embodiment of a primary circuit 300 that may be used in connection with the example power supply embodiment of FIG. 2. Primary circuit 300 includes a switch 310 and a switch 320, which for this example are MOSFETs.

When control and counting unit 250 asserts a primary enable signal 301, switch 310 turns on and the input voltage from input 215 is applied to the upper part of the primary side of transformer 240. For this example embodiment, the input voltage is approximately 52V. The input voltage is also applied to the cathodes of a diode 330 and a zener diode 340. In this condition, diode 330 is reverse biased so substantially no current flows through it. For this example embodiment, the zener voltage for zener diode 340 is 39V. Because the input voltage of 52V, is greater than the zener voltage of 39V, a 13V (52V−39V) signal is seen at the anode of zener diode 340, which is coupled to resistor 360 and a switch 320, rapidly charging the switch's gate capacitance. The voltage applied to switch 320 causes switch 320 to turn on, allowing current to flow through the primary of transformer 240. While switch 310 is on but before switch 320 has turned on, diode 350 has zero volts across it so no current flows. When switch 320 turns on in addition, diode 350 is reverse biased by 52V, maintaining the substantially zero current state of diode 350.

When primary enable signal 301 is deasserted, switch 310 stops conducting and the voltage applied to the primary of transformer 240 begins to fall rapidly due to the inductive kickback of the primary of transformer 240. Once this voltage falls slightly below 52V, zener diode 340 stops conducting and the 13V signal on the gate capacitance of MOSFET 320 begins to discharge through resistor 360. This discharge is slow but once the voltage on the cathode of zener 340 gets driven below 13V by the transformer, the zener diode becomes forward biased and quickly drags the gate of switch 320 to 0V thereby turning switch 320 off. Thus a portion of the energy stored in transformer 240 is actually used to turn off switch 320 very quickly. Diode 330 clamps the voltage at the node joining the cathode of diode 330 and transformer 240 so that it will not fall more than a diode voltage drop below ground. Once switch 320 has turned off, the voltage at the node joining the anode of diode 350 with switch 320 and with the lower part of the primary transformer 240 begins to rise quickly until it gets clamped by diode 350 at a diode voltage drop above the voltage of input 215.

Although the discussion above mentions 52V for an input voltage and 39V for a zener voltage, other embodiments are possible using a wide range of input voltages and zener voltage values.

Figure 4:
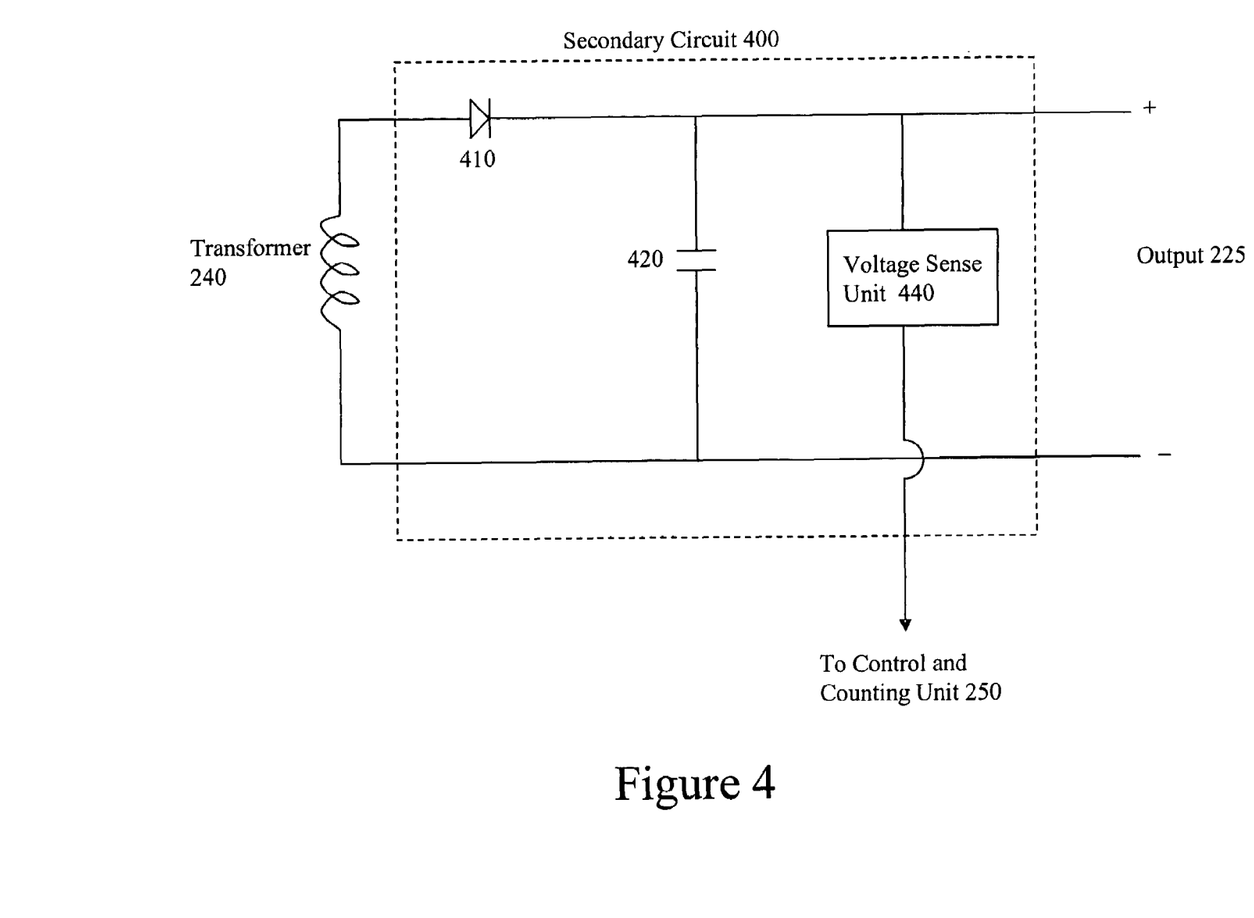
FIG. 4 is a block diagram of an embodiment of an example secondary circuit that may be used in connection with the example embodiment of FIG. 2.

FIG. 4 is a block diagram of an embodiment of an example secondary circuit 400 that may be used in connection with the example embodiment of FIG. 2. Secondary circuit 400 includes a diode 410 and a capacitor 420. Secondary circuit 400 also includes a voltage sense unit 440 coupled to output 225.

When switches 310 and 320 are on, current flows through the primary side of transformer 240 and energy is stored in the transformer. When switches 310 and 320 are off, the stored energy is transferred out into secondary circuit 400 via the secondary windings of transformer 240. The polarity of the windings and the orientation of diode 410 are chosen to substantially block conduction of current in the secondary windings when switches 310 and 320 are on.

For this example embodiment, switch 310 is controlled by control and counting unit 250. Control and counting unit 250 operates according to a periodic clock. For this example, the clock has a fixed frequency. Also for this example embodiment, for every clock period a determination is made by control and counting unit 250 as to whether to assert the primary enable signal 301 to switch 310. Further for this example embodiment, the clock may be operated at a fixed frequency and whenever a determination is made to enable switch 310, primary enable signal 301 is asserted for predetermined period of time, resulting in a predetermined "on time" for switches 310 and 320.

The determination as to whether to enable switch 310 is based at least in part on the voltage sensed by voltage sense unit 440. For one embodiment, the voltage may be measured relative to ground. Other embodiments may sense the difference between the positive and negative nodes of output 225. If voltage sense unit 440 detects a voltage that is below a reference voltage level, then control and counting unit 250 can enable switch 310 for the next clock period. Similarly, if voltage sense unit 440 detects a voltage that is greater than the reference voltage level, then control and counting unit 250 does not enable switch 310 for the next clock period. Therefore, for heavier loads at a secondary circuit output, switch 310 is enabled more often. Switch 310 is enabled less often for lighter loads.

For this embodiment, power supply 200 is operated in discontinuous conduction mode, which means that the energy stored in transformer 240 has been substantially reduced to zero before the next energy cycle, generally resulting in the secondary current reaching zero before the next cycle.

If power supply 200 is operated in discontinuous conduction mode, and if voltage regulation is accomplished on a whole-cycle basis, and if the primary switch 310 is operated at a fixed on time, and given a predetermined input voltage, then the amount of energy delivered to the secondary circuits can be determined by counting the number of clock periods during which switch 310 is enabled over a period of time.

Although the example embodiments discussed above describe one secondary circuit coupled to the primary circuit via a transformer and not additional secondary circuits, other embodiments are possible that use more than one secondary circuit. For embodiments that use two or more secondary circuits, the overall power consumption may be measured using a single counter, or switches may be implemented into the secondary circuits allowing one secondary to be turned on while the others are turned off. In this case, one or more counters can track the number of primary switch enablings corresponding to each selected secondary. Control and counting unit 250 may control which of the secondary circuits are enabled at a given time. Control and counting unit 250 may include a counter for each of the secondary circuits. In this manner, control and counting unit 250 can maintain separate counts corresponding to each of the secondary circuits.

Control and counting unit 250 may also include one or more registers to store count information. It is also possible to include a number of additional counters and timers for performing measurements over various periods of time or for more than one secondary circuit.

As discussed previously, although the embodiments described herein use one or more counters to count the number of times a primary switch is enabled over a period of time, other embodiments are possible where a timer is used to determine how long it takes for a predetermined number of primary switch enablings to occur.

Power supply circuit 200 may be implemented into a larger system, perhaps as part of an image forming device such as a printer. The system may include a processor that can access the count registers and perform calculations to determine various aspects of power delivery.

Although the embodiments discussed herein mention operation in discontinuous conduction mode, other embodiments are possible using continuous conduction mode, although the calculations to determine the amount of power delivered over a period of time may be more involved than is the case with discontinuous conduction mode.

Further, although the power supply circuit 200 is based on a flyback topology, other embodiments are possible using other arrangements including, but not limited to, buck or boost.

The embodiments described above have the capability of being able to perform measurements continuously and quickly. This may be useful in image forming devices such as inkjet printers.

Other embodiments are possible where the above mentioned measurement techniques could be used to implement a programmable power limit into the power supply. One embodiment may allow a predetermined, programmable amount of energy to be delivered to an output during a predetermined, programmable window of time, not allowing delivery of energy at other times, effectively limiting the average power delivered by the supply. Because the limit is programmable, the limit can be changed dynamically as system conditions warrant.

Figure 5:
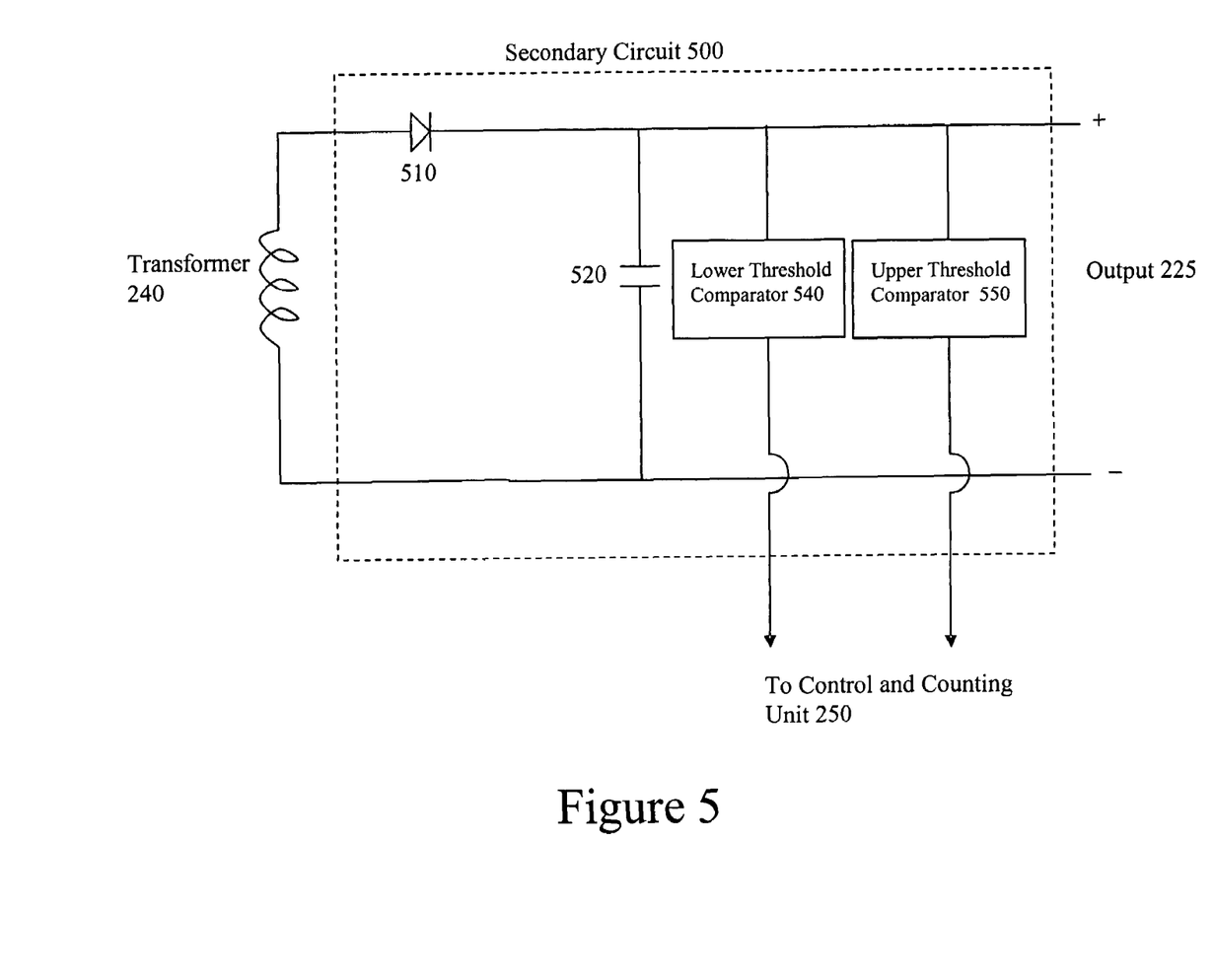
FIG. 5 is a block diagram of an embodiment of an example secondary circuit that may be used in connection with the example embodiment of FIG. 2.

FIG. 5 is a block diagram of an embodiment of an example secondary circuit 500 that may be used in connection with the example embodiment of FIG. 2. This example embodiment may be used in place of the circuit of FIG. 4. Other embodiments may use a combination of the example embodiments of FIGS. 4 and 5.

Secondary circuit 500 includes a diode 510, and a capacitor 520. The arrangement of these components is similar to that described above in connection with FIG. 4. Secondary circuit 500 also includes a lower threshold comparator 540 and an upper threshold comparator 550, each coupled to output 225. For one embodiment, the output voltage may be measured relative to ground. Other embodiments may sense the difference between the positive and negative nodes of output 225. Lower threshold comparator 540 may be used to detect an undervoltage condition. For this embodiment, if lower threshold comparator 540 indicates to control and count unit 250 that the voltage at output 225 is below a lower threshold voltage, then control and count unit 250 causes switch 310 to operate in a low duty cycle mode. This duty cycle is chosen so that even in the case of a shorted output or a completely discharged output capacitor 520, there will still be enough time in the off state of switch 310 for the transformer energy to dissipate, helping to guard against transformer saturation. For this example embodiment, in the low duty-cycle mode the control and counting unit 250 will assert the primary enable signal 301 no more than one time every ten clock cycles. Also for this example embodiment, the low duty cycle mode may be used before a heavy load applied to the output 225.

When lower threshold comparator 540 indicates that the output voltage is greater than the lower threshold voltage, then control and count unit 250 causes switch 310 to operate in a high duty cycle mode. In the high duty cycle mode, the primary enable signal 301 may be asserted each clock cycle unless the output voltage exceeds the upper threshold voltage. The duty cycle and on time are selected to help guard against transformer saturation while allowing for full power transfer. When operating in the high duty cycle mode, upper threshold comparator 550 may be used to gate the enablement of switch 310. In other words, when the output voltage exceeds the upper threshold voltage, control and count unit 250 does not enable switch 310.

For this example embodiment, the lower threshold voltage may be set at 20V, and the higher threshold voltage may be set at 26V. Of course, other embodiments are possible using other threshold voltages. The threshold voltage levels may be programmable. Further, although the example embodiment described above in connection with FIG. 5 utilizes two threshold levels, other embodiments are possible using a wide range of numbers of thresholds and/or duty cycle modes.

Figure 6:
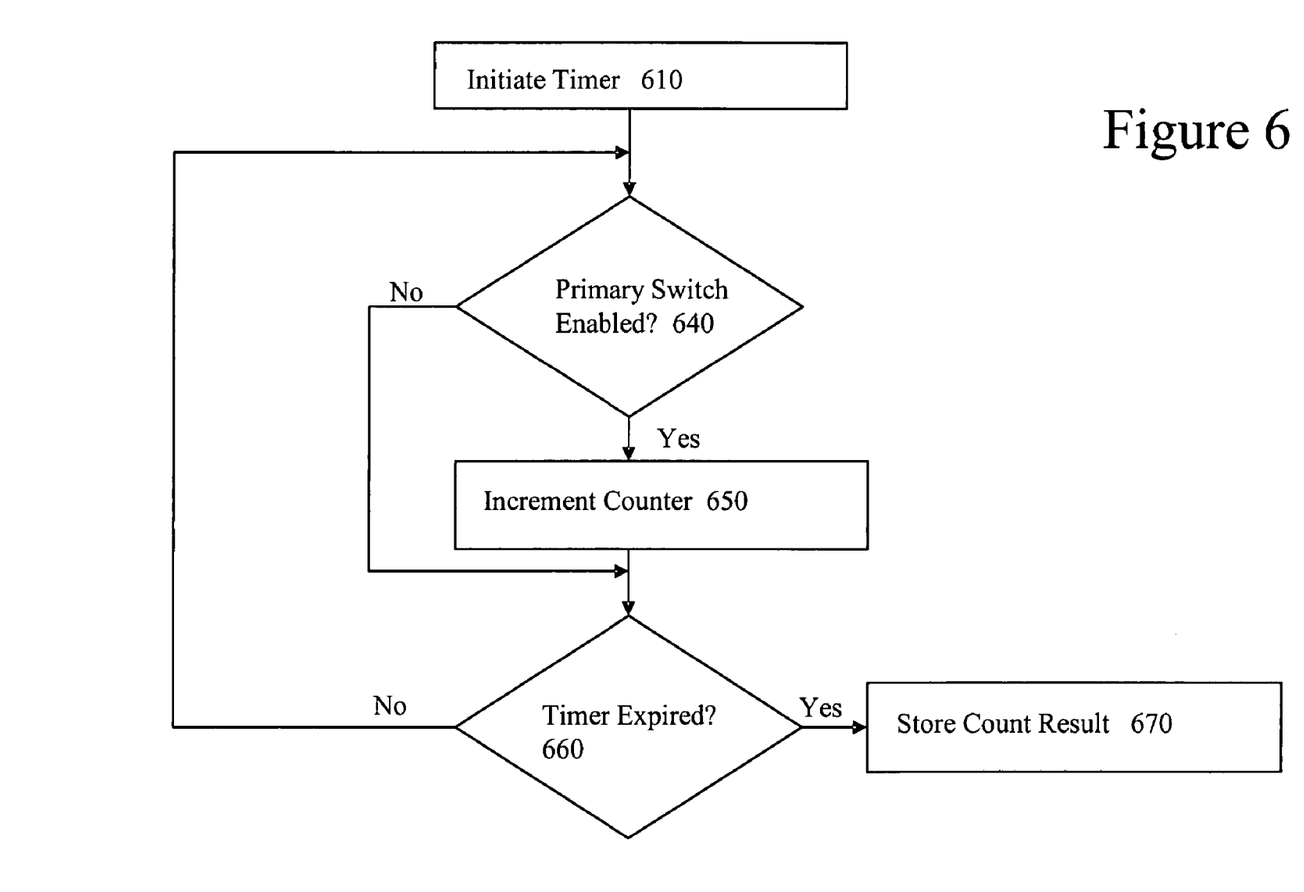
FIG. 6 is a flow diagram of one embodiment of a method for measuring power consumption.

FIG. 6 is a flow diagram of one embodiment of a method for measuring power consumption. At block 610, a timer is initiated. A counter may also be reset. A determination is made at block 640 as to whether a primary switch is enabled, thereby allowing power transfer from a primary circuit to a secondary circuit. If the switch is enabled, then at block 650 a counter is incremented. If the switch is not enabled, then the counter is not incremented. The determination as to whether or not the switch is enabled may be carried out on a clocked basis. Further, the timer period may be a multiple of the decision clock period. At block 660 a check is made to see if the timer has expired. If the timer has expired, then the count value is stored in a register or other storage location for later retrieval. If the timer has not yet expired, then processing returns to block 640.

Figure 7:
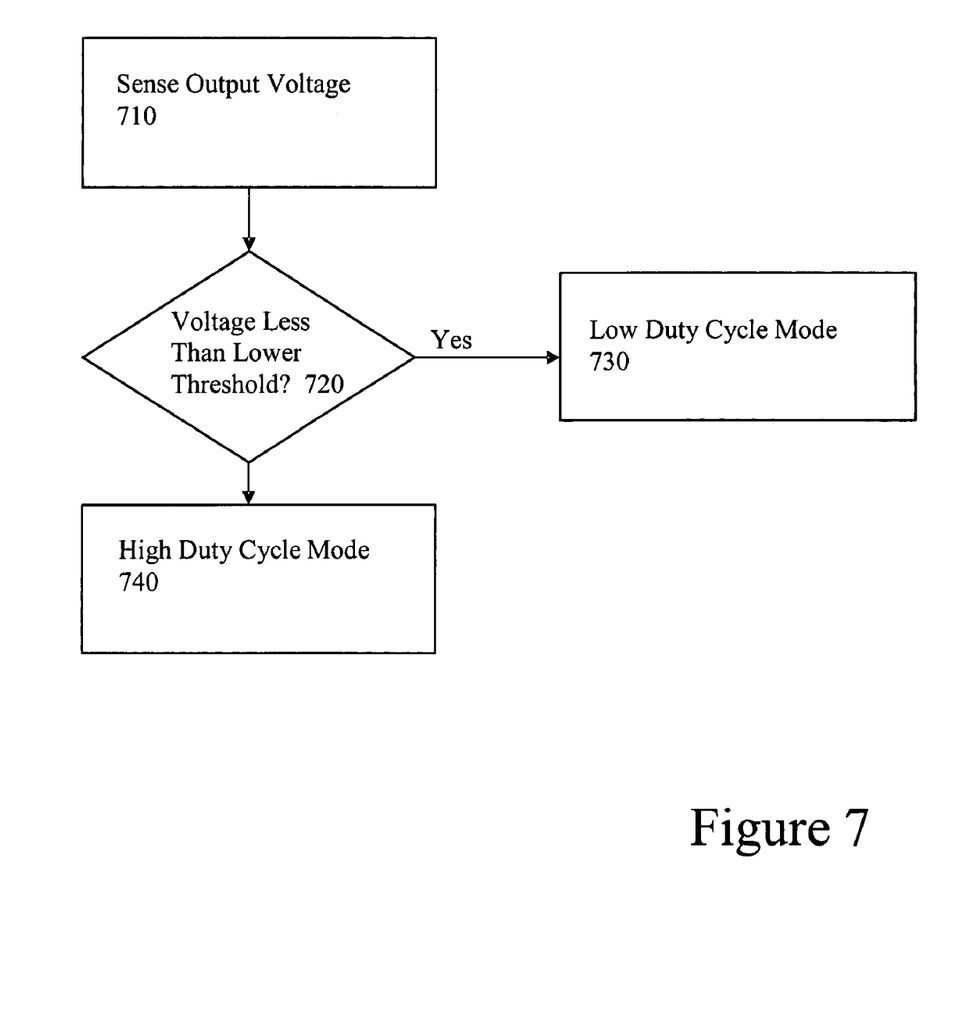
FIG. 7 is a flow diagram of one embodiment of a method for selecting from a plurality of duty cycle modes depending on output voltage.

FIG. 7 is a flow diagram of one embodiment of a method for selecting from a plurality of duty cycle modes depending on power supply output. At block 710 an output voltage is sensed at an output of a secondary circuit. If the output voltage is less than a lower threshold voltage, as determined at block 720, then at block 730 power supply operation enters a low duty cycle mode. Otherwise, power supply operation enters a high duty cycle mode, as depicted at block 740. In high duty cycle mode, other voltage comparisons may be made to a higher threshold voltage in order to provide voltage regulation.

The disclosed embodiments may relate to program instructions stored on a machine readable medium for performing various computer-implemented operations. The machine readable medium for storing the program instructions may comprise, for example, a magnetic or optical disk, a volatile memory such as a Random Access Memory (RAM), a Read-Only Memory (ROM), an Erasable Programmable Read-Only Memory (EPROM or Flash memory) or any other storage medium for storing the program instructions for execution.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather than in a restrictive sense.

What is claimed is:

1. An apparatus, comprising:
a switching power supply circuit having a switch;
a counter to count a number of times of enabling the switch of the power supply circuit; and
a control unit configured to determine power drawn from the supply circuit based upon the number of times of enabling of the switch of the power supply circuit.

2. The apparatus of claim 1, wherein the counter counts the number of times the power supply circuit is enabled over a predetermined period of time.

3. The apparatus of claim 1, further comprising a timer to determine a time for the counter to count a predetermined number of power supply enablings.

4. The apparatus of claim 1, further comprising a control unit to enable the power supply circuit for a predetermined number of counts.

5. The apparatus of claim 1, wherein the power supply circuit including a primary circuit and a secondary circuit, the primary circuit including a primary switch, the control unit to receive output voltage information from the secondary circuit and to control operation of the primary switch according to the output voltage information received from the secondary circuit, the control unit farther including the counter to count the number of clock periods where the primary switch is turned on over a period of time.

6. The apparatus of claim 1, wherein the secondary circuit includes a voltage sense unit to monitor an output voltage and communicate the output voltage information to the control unit.

7. The apparatus of claim 6, wherein the primary switch includes a transistor having a gate terminal, the control unit to control operation of the primary switch by asserting a signal to the gate of the primary switch transistor depending on the output voltage information received from the secondary circuit.

8. The apparatus of claim 7, wherein the control wilt operates according to a clock, the control circuit to determine on a cycle-by-cycle basis whether to assert the signal to the gate of the primary switch transistor.

9. The apparatus of claim 8, wherein the control unit further includes a register to hold a count value corresponding to the number of clock periods where the primary switch transistor is turned on.

10. The apparatus of claim 9, further comprising a transformer to couple the primary circuit to the secondary circuit, the power supply configured to operate in discontinuous conduction mode.

11. The apparatus of claim 1, wherein the secondary circuit includes a lower threshold comparator to monitor an output voltage and communicate undervoltage information to the control unit.

12. The apparatus of claim 11, wherein the control unit causes the power supply circuit to operate in a low duty cycle mode when the lower threshold comparator indicates an undervoltage condition.

13. The apparatus of claim 12, wherein the control unit causes the power supply circuit to operate in a high duty cycle mode when the lower threshold comparator indicates that the output voltage exceeds a lower threshold voltage value.

14. The apparatus of claim 1, wherein the secondary circuit includes an upper threshold comparator to monitor an output voltage and communicate output voltage information to the control unit.

15. The apparatus of claim 1, wherein the control unit causes the power supply circuit to transfer a programmable amount of energy using the counter.

16. A method, comprising:
determining whether a switch of a switching power supply circuit is enabled;
incrementing a counter if the the switch of the switching power supply circuit is enabled; and
determining power drawn from the switching power supply circuit based upon the number of times of enabling of the switch of the power supply circuit.

17. The method of claim 16, wherein determining whether the power supply circuit is enabled includes determining whether a primary circuit switch is enabled to allow power to be transferred from a primary circuit to a secondary circuit.

18. The method of claim 17, further comprising counting the number of times the primary switch is enabled over a period of time.

19. The method of claim 17, further comprising determining a time for the counter to count a predetermined number of power supply enablings.

20. The method of claim 17, further comprising sensing an output voltage of the secondary circuit and communicating the output voltage information to the control unit.

21. The method of claim 17, further comprising comparing an output voltage of the secondary circuit with a lower threshold voltage value and communicating undervoltage information to the control unit if the output voltage is below the lower threshold voltage value.

22. The method of claim 21, further comprising operating the power supply circuit in a low duty cycle mode if undervoltage information is communicated to the control unit.

23. The method of claim 21, further comprising operating the power supply circuit in a high duty cycle mode if the output voltage exceeds the lower threshold voltage value.

24. The method of claim 17, further comprising comparing an output voltage of the secondary circuit with a higher threshold voltage value and communicating a result of the comparison to the control unit.

25. The method of claim 17, further comprising transferring a programmable amount of energy from the primary circuit to the secondary circuit wherein the amount of energy is determined at least in part by the counter.

26. The method of claim 16, comprising:
initiating a timer before determining whether a power supply circuit is enabled; and
stopping the timer when the counter reaches a predetermined value.

27. The method of claim 26, wherein stopping the timer when the counter reaches a predetermined value includes stopping the timer when the counter reaches a programmable value.

28. A method, comprising:
applying an input voltage to a primary circuit of a switching power supply;
counting a number of times of enabling a switch of the switching power supply to transfer of energy from the primary circuit to a secondary circuit of the switching power supply;
comparing a voltage level at an output of the secondary circuit of the power supply with a first threshold voltage level; and
causing the power supply to operate in one of a plurality of modes depending on the results of the comparison.

29. The method of claim 28, wherein comparing a voltage level at the output with a first threshold voltage level includes comparing the voltage level at the output with a lower threshold voltage and further wherein causing the power supply to operate in one of a plurality of modes depending on the results of the comparison includes causing the power supply circuit to operate in a low duty cycle mode if the voltage level at the output is less than the lower threshold voltage.

30. The method of claim 28, wherein comparing a voltage level at the output with a first threshold voltage level includes comparing the voltage level at the output with a lower threshold voltage and further wherein causing the power supply to operate in one of a plurality of modes depending on the results of the comparison includes causing the power supply circuit to operate in a high duty cycle mode if the voltage level at the output is greater than the lower threshold voltage.

31. A system, comprising:
- a power supply circuit including a primary circuit and a secondary circuit the primary circuit including a primary switch;
- a control unit to receive output voltage information from the secondary circuit and to control operation of the primary switch according to the output voltage information received from the secondary circuit, the control unit further including a counter to count the number of times that the primary switch is turned on over a period of time; and
- a processor coupled to the control unit.

32. The system of claim 31, wherein the secondary circuit further includes a first voltage comparator and a second comparator coupled to a secondary circuit output.

33. The system of claim 31, wherein the secondary circuit includes a voltage sense unit to monitor an output voltage and communicate the output voltage information to the control unit.

34. An apparatus, comprising:
- means for supplying power including a means for a primary circuit and a means for a secondary circuit;
- a switch for transferring power from the primary circuit means to the secondary circuit means;
- means for receiving output voltage information from the secondary circuit means;
- means for controlling operation of the primary circuit means according to the output voltage information received from the secondary circuit means; and
- means for counting the number of times that the switch is turned on to allow transfer of power.

35. A machine-readable medium containing instructions that when executed perform a method, comprising:
- determining whether a power supply circuit is enabled by determining whether a primary circuit switch is enabled to allow power to be transferred from a primary circuit to a secondary circuit;
- incrementing a counter if the primary circuit switch of the power supply circuit is enabled;
- counting the number of times the primary circuit switch is enabled over a period of time; and
- determining power supplied by the power supply circuit based upon a count from the counter.

36. The machine-readable medium of claim 35, further comprising determining the amount of power transferred to the secondary circuit in part by using the number of clock cycles during which the primary circuit switch is enabled over a period of time and an input voltage.

* * * * *

UNITED STATES PATENT AND TRADEMARK OFFICE
CERTIFICATE OF CORRECTION

PATENT NO. : 7,506,180 B2  Page 1 of 1
APPLICATION NO. : 11/077627
DATED : March 17, 2009
INVENTOR(S) : David K. Klaffenbach et al.

It is certified that error appears in the above-identified patent and that said Letters Patent is hereby corrected as shown below:

In column 7, line 13, in Claim 5, delete "farther" and insert -- further --, therefor.

In column 7, line 26, in Claim 8, delete "wilt" and insert -- unit --, therefor.

In column 7, line 61, in Claim 16, delete "the the" and insert -- the --, therefor.

In column 9, line 3, in Claim 31, after "secondary circuit" insert -- , --.

Signed and Sealed this

Twenty-fourth Day of November, 2009

David J. Kappos
*Director of the United States Patent and Trademark Office*